A. J. BURKETT.
Ornamentation of Leather.

No. 228,727.   Patented June 15, 1880.

Witnesses:
E. E. Masson
Philip Mauro

Inventor:
Andrew J. Burkett
by J. Pollok
atty.

UNITED STATES PATENT OFFICE.

ANDREW J. BURKETT, OF OTTUMWA, IOWA.

ORNAMENTATION OF LEATHER.

SPECIFICATION forming part of Letters Patent No. 228,727, dated June 15, 1880.

Application filed February 24, 1880.

*To all whom it may concern:*

Be it known that I, ANDREW J. BURKETT, of Ottumwa, Wapello county, State of Iowa, have invented a new and useful Improvement in Ornamentation of Leather, which invention is fully set forth in the following specification.

The invention relates to the ornamentation of leather by means of engraved rollers, for saddles, ornamental strap-work, and a variety of other manufactured articles in which leather is used.

It consists in a method of ornamenting leather by embossing the same with a heated engraved roller or rollers, and at the same time coloring the embossed surface by coloring-matter applied to said roller or rollers. This method gives embossed and colored effects of a highly ornamental character. The heating of the engraved rollers is necessary to the production and permanence of these effects.

The invention further consists in a machine or apparatus comprising one or more engraved rollers, with means for heating the same, and color-applying devices; also, in the connection of said color-applying devices with the frame of the machine detachably, so that the heated engraved rollers may be used simply for embossing, when desired; and also in the particular construction and combinations of parts, as hereinafter more fully set forth.

In order that the invention and the manner of carrying it into effect may be better understood, reference is made to the accompanying drawings, which form a part of this specification, and which represent a machine constructed in accordance with said invention.

Figure 1:
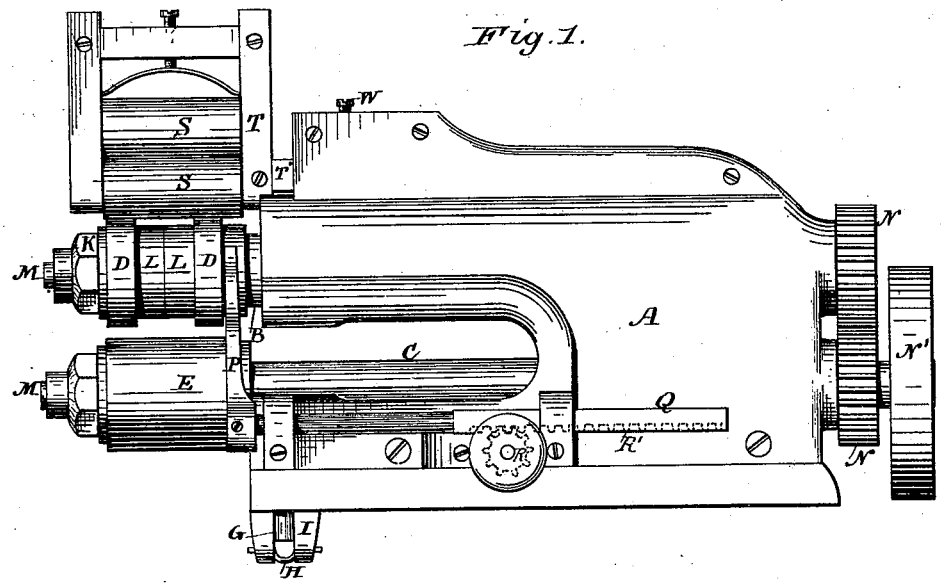
Figure 2:
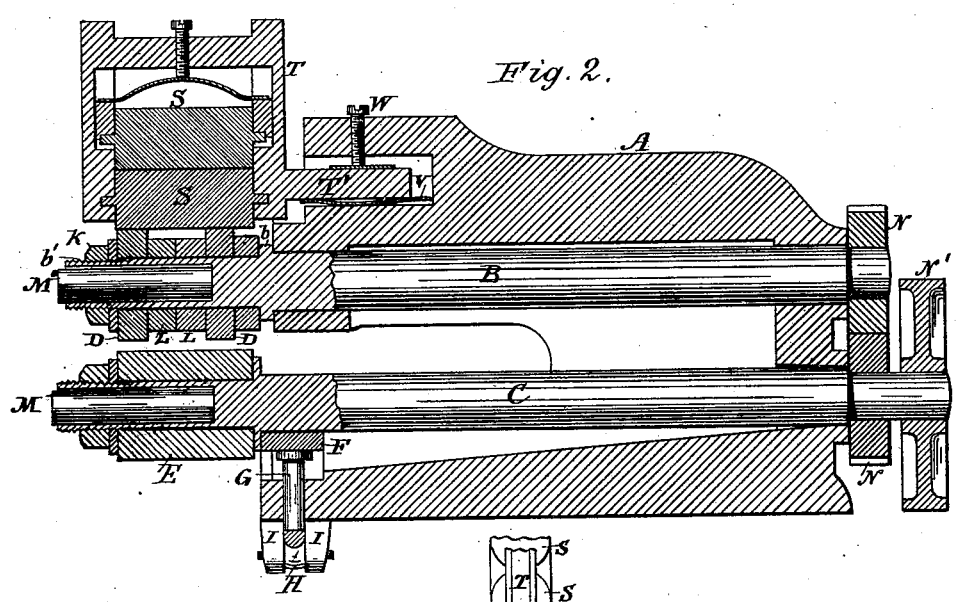
Figure 3:
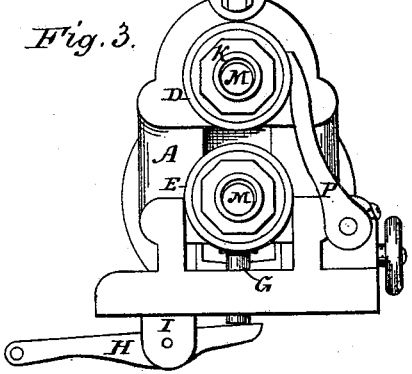

Figure 1 is a side elevation; Fig. 2, a vertical longitudinal section, and Fig. 3 an end view.

The same letters refer to like parts on all the figures.

A is the frame of the machine, in which the spindles B C are supported, the upper one, B, which carries at its outer end (to the left in Figs. 1 and 2) the engraved rollers D, turning in fixed bearings, while the lower one, C, which carries the bed-roller E, rests at the outer end upon a vertically-movable block, F, its outer bearing being adapted in any ordinary or suitable way to permit the rise and fall, within certain limits, of the outer end of the spindle. The block F moves in ways or guides, and is elevated, when required, by means of a pin, G, fixed to the under side of the block, and a lever, H, pivoted to a projection, I, on the frame A, and operated directly by the workman or through suitable connections.

The engraved rollers D are secured upon the end of the spindle B by suitable means, such as a nut, K, and a shoulder, b, and a screw-thread, b', on the spindle. Any desired number of these rollers may be employed. Two are shown, held apart by washers L. By employing different sizes and numbers of washers the rollers may be adjusted in position on the spindle.

The bed-roller E is fastened upon the lower spindle, C, by a screw-thread nut and shoulder; but any ordinary or suitable means for fastening a roller on a spindle may be used. Both spindles are hollow at the end, and are provided each with a metal bar, M, which is removably inserted therein. This bar is heated and introduced into its recess to heat the rollers.

It will, of course, be understood that in practice there would be a number of such bars, so that some could be heating while others were inserted in the spindles, and thus a constant temperature at the proper degree could be maintained.

The spindles are connected together by gears N, and power is communicated to one of the spindles in any ordinary or suitable way, as by means of a belt-pulley, N'.

P is a guide-arm, which is fixed upon a sliding rod or bar, Q, movable and adjustable in ways or guides by means of a pinion, R, journaled in bearings on the machine-frame, and a rack, R', attached to or forming a part of the rod or bar Q.

Above the engraved rollers D are ink or color rollers S, for applying color to the surface of the engraved rollers. They are or may be such rollers as commonly employed for applying color when required in the arts. The upper one is held against the lower by a spring and set-screw, as shown in Figs. 1 and 2.

These rollers S are supported in a frame, T, which is provided from one side with an arm, T'. This arm is inserted in a recess in the frame of the machine, and rests upon a spring, V, while a set-screw, W, bears upon it, and the frame is thus supported above the engraved roller.

The spring V serves to give a yielding pressure to lower roller S against the surface of the engraved roller. By tightening the set-screw W this pressure may be increased, and by loosening sufficiently the set-screw the spring V will lift the frame T, so that the color-roller is clear of said surface. By further loosening the screw the frame may be readily removed.

The method of ornamenting leather in accordance with the invention and the operation of the machine will be readily understood.

The rollers D, engraved with a suitable design, are secured in proper position upon the spindle B, and likewise the bed-roller, which is preferably a plain roller with a smooth surface, upon the spindle C. They are both then heated by means of the bars M, which, being previously made hot, are introduced into their recesses in the spindles B and C. The rollers S are prepared with the color to be applied. The guide-arm P is adjusted so that it will be in proper position for the edge of the leather to bear against. The leather is placed upon the bed-roller, which is then raised and the machine started. The leather passing between the heated bed-roller and the heated engraved rollers is embossed by the latter, which transfer thereto the design with which they are engraved, and also the coloring-matter which they receive from the color-rollers S.

In passing through the machine the leather is guided by the arm P. If the coloring of the embossed leather is not desired the color-rollers may be lifted clear of the engraved rollers, or they may, together with their supporting-frame, be removed.

It is obvious that the rollers may be heated in many ways; but the one described is regarded as the most convenient. Good effects may be produced by heating the engraved rollers only, and not the bed-roller; but it is preferred to heat both. If the leather is to be embossed, or embossed and colored on both sides, which is not ordinarily required, the bed-roller may be replaced by engraved rollers and washers, and additional color-rollers provided for the lower rollers.

I do not intend to limit myself to the details of the machine, as it is obvious that modifications may be made without departing from the spirit of this invention. Instead of having the design to be embossed engraved, it is evident that it might be formed on the surface of the rollers in any other ordinary or suitable way.

Having thus fully described my said invention, and the manner in which the same is or may be carried into effect, what I claim, and desire to secure by Letters Patent, is—

1. The method of ornamenting leather consisting in embossing the leather by a heated roller or rollers having upon the surface a suitable design, and at the same time coloring the embossed surface of the leather by coloring-matter applied to said roller or rollers, substantially as described.

2. The combination, with a leather-embossing apparatus provided with one or more engraved rollers, and means, as indicated, whereby the same can be heated, of devices, substantially as set forth, for applying coloring-matter to the surface of said roller or rollers.

3. The combination, in a leather-embossing machine, with the bed-roller, one or more engraved rollers, and means, as indicated, for heating the latter, of the color-applying devices carried by a supporting-frame detachably connected with the frame of the machine, substantially as described.

4. The combination, with the engraved roller or rollers of a leather-embossing machine, of color-applying rollers, a supporting-frame, and devices, such as a set-screw and spring, for connecting said supporting-frame to the frame of the machine, so that the said color-roller bears upon said engraved roller or rollers with a yielding and adjustable pressure, substantially as described.

5. The combination, in a leather-embossing machine, of an upper and a lower spindle, one or more engraved rollers, a bed-roller, means, as indicated, for heating the engraved and bed rollers, and color-applying devices supported in a frame connected with the machine-frame, substantially as described.

In testimony whereof I have signed this specification in the presence of two subscribing witnesses.

ANDREW J. BURKETT.

Witnesses:
G. W. SMITH,
G. A. WITTER.